(12) United States Patent
Kusunoki

(10) Patent No.: US 11,802,595 B2
(45) Date of Patent: Oct. 31, 2023

(54) CAM CLUTCH

(71) Applicant: TSUBAKIMOTO CHAIN CO., Osaka (JP)

(72) Inventor: Sota Kusunoki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/122,306

(22) Filed: Mar. 16, 2023

(65) Prior Publication Data

US 2023/0304547 A1  Sep. 28, 2023

(30) Foreign Application Priority Data

Mar. 22, 2022 (JP) ................................ 2022-045461

(51) Int. Cl.
  *F16D 41/07* (2006.01)
  *F16D 41/08* (2006.01)
  *F16D 41/06* (2006.01)

(52) U.S. Cl.
  CPC ............. *F16D 41/07* (2013.01); *F16D 41/08* (2013.01); *F16D 2041/0603* (2013.01)

(58) Field of Classification Search
  CPC ...... F16D 41/07; F16D 41/061; F16D 41/084; F16D 2041/0603; F16D 2041/0605; F16D 2041/0601
  See application file for complete search history.

(56) References Cited

U.S. PATENT DOCUMENTS

| | | | | |
|---|---|---|---|---|
| 4,693,351 | A | * | 9/1987 | Adolfsson ............... F16D 43/02 192/48.92 |
| 5,343,992 | A | * | 9/1994 | Stark ..................... F16D 41/061 192/93 C |
| 2014/0202821 | A1 | * | 7/2014 | Schotten ............... F16D 41/084 192/45.1 |

FOREIGN PATENT DOCUMENTS

JP  2011-231828 A  11/2011

* cited by examiner

*Primary Examiner* — Timothy Hannon
(74) *Attorney, Agent, or Firm* — WHDA, LLP

(57) ABSTRACT

An object of the present invention is to provide a cam clutch that has a simple structure and is capable of preventing the occurrence of cam jamming and that can be reduced in size while realizing improved functionality. The cam clutch according to the present invention includes an operating mode switching mechanism that includes an outer ring-side cage ring provided to be capable of moving in the axial direction and configured to be capable of modifying the attitude of first cams, an inner ring-side cage ring provided to be capable of moving in the axial direction and configured to be capable of modifying the attitude of second cams having different meshing direction from the first cams, and a position regulating cage ring for regulating the freedom of movement of the outer ring-side cage ring and the inner ring-side cage ring in the circumferential direction are provided.

7 Claims, 9 Drawing Sheets

CAM CLUTCH

BACKGROUND OF THE INVENTION

1. Field of the Invention

The present invention relates to a cam clutch that can be switched between operating modes.

2. Description of the Related Art

A two-way clutch that can be switched between driving and idling in both a forward direction and a reverse direction is available as a clutch for controlling the transmission and blocking of rotational force.

For example, Japanese Patent Application Publication No. 2011-231828 describes a clutch that can be switched between three operating modes, namely a two-direction free mode in which rotation in both a forward direction and a reverse direction is permitted, a one-direction lock mode in which only rotation in the forward direction is permitted and rotation in the reverse direction is prohibited, and a one-direction lock mode in which only rotation in the reverse direction is permitted and rotation in the forward direction is prohibited, by controlling a retainer that retains both first sprags and second sprags, which are biased by biasing means such that a rotation locking direction serves as the reverse direction.

SUMMARY OF THE INVENTION

In the two-way clutch described above, all of the first sprags and second sprags are forcibly tilted by controlling the retainer when modifying the operating mode, and it is therefore impossible to realize a two-direction lock mode in which relative rotation of an outer ring and an inner ring is prohibited in both the forward direction and the reverse direction.

Moreover, in the two-way clutch described above, the first sprags and second sprags are biased so as to contact the outer ring and the inner ring, and therefore, when torque acts on the outer ring or the inner ring, one set of sprags tilts so as to immediately start meshing with the outer ring and the inner ring, while the other set of sprags continues to contact the outer ring and the inner ring while sliding and is thereby maintained in a meshing standby state.

When the torque load is released, the meshed sprags tilt in a meshing release direction and thereby shift to an idling state, but at this time, the other sprags may tilt in the meshing direction so as to start meshing with the outer ring and the inner ring before the meshed sprags are released, and as a result, "jamming", in which all of the cams are meshed simultaneously, may occur.

In this state, all of the sprags are meshed at a high surface pressure, and therefore, when the operating mode of the clutch is switched from a locked mode in which relative rotation of the outer ring and the inner ring is prohibited in one or both of the forward direction and the reverse direction to the free mode in which relative rotation of the outer ring and the inner ring is permitted in both directions, a large force is required to modify the attitude of the sprags, and as a result, engagement surfaces on which the sprags engage with the outer ring and the inner ring and respective raceway surfaces of the outer ring and the inner ring may be damaged, leading to a reduction in the life of the clutch. Moreover, an attitude modifying member for modifying the attitude of the sprags requires a high degree of rigidity.

Furthermore, cams serving as engagement elements of a cam clutch are typically formed to have arc-shaped side surfaces, and therefore a problem occurs in that with such an outer contour shape, it is difficult to secure a sufficient rolling distance for the cams due to the contact position relationship between the cams and the retainer that functions as the means for modifying the attitude of the cams.

The present invention has been designed on the basis of the circumstances described above, and an object thereof is to provide a cam clutch that has a simple structure and is capable of preventing the occurrence of cam jamming so that operations, including an operating mode switching operation, can be performed smoothly, and that can be reduced in size while exhibiting improved functionality.

The present invention solves the problems described above by providing a cam clutch cam clutch including an outer ring and an inner ring provided to be capable of rotating relative to each other on an identical rotary axis, a plurality of cams arranged in a circumferential direction between the outer ring and the inner ring, and biasing means for biasing each of the plurality of cams so as to contact the outer ring and the inner ring, wherein the plurality of cams include first cams and second cams having different meshing directions with respect to the outer ring and the inner ring, the cam clutch includes an operating mode switching mechanism for switching an operating mode of the cam clutch, and the operating mode switching mechanism includes an outer ring-side cage ring provided to be capable of moving in an axial direction independently of rotation operations of the outer ring and the inner ring and configured to be capable of modifying the attitude of the first cams, an inner ring-side cage ring provided to be capable of moving in the axial direction independently of the rotation operations of the outer ring and the inner ring and configured to be capable of modifying the attitude of the second cams, and a position regulating cage ring provided between the outer ring-side cage ring and the inner ring-side cage ring in order to regulate the freedom of movement of the outer ring-side cage ring and the inner ring-side cage ring in the circumferential direction.

According to the invention as in claim 1, by providing the outer ring-side cage ring with a function for controlling the attitude of the first cams, providing the inner ring-side cage ring with a function for controlling the attitude of the second cams, and regulating the freedom of movement of the outer ring-side cage ring and the inner ring-side cage ring in the circumferential direction using the position regulating cage ring, the cams can be tilted and held in a modified attitude simply by moving one or both of the outer ring-side cage ring and the inner ring-side cage ring in the axial direction. Hence, the cam clutch can be configured to have a simple structure and high functionality compatible with four operating modes.

Further, by regulating the freedom of movement of the outer ring-side cage ring and the inner ring-side cage ring in the circumferential direction, the occurrence of jamming, in which both the first cams and the second cams mesh with the outer ring and the inner ring, can be avoided when modifying the attitude of the cams, and as a result, a smooth operation can be realized and a high degree of responsiveness can be obtained.

According to the invention as in claim 2, by altering the opening shapes of the first and second cam holding portions of each of the outer ring-side cage ring and the inner ring-side cage ring serving as the operating mode switching mechanism, it is possible to tilt only the first cams or only the second cams. In other words, by forming a mechanism for modifying the attitude of the cams integrally with each of the outer ring-side cage ring and the inner ring-side cage ring, it is possible to realize a simplified structure, a size reduction, a reduction in the number of components, and an increase in holding torque. Moreover, by forming the opening shapes of the first cam holding portion of the outer ring-side cage ring and the second cam holding portion of the inner ring-side cage ring in an irregular shape having an opening width varying portion with an opening width that varies continuously rather than in a simple rectangular shape, slight jamming caused by a manufacturing error or the like can be released with a small amount of thrust. In addition, by appropriately modifying the opening shapes of the first and second cam holding portions of the outer ring-side cage ring and the inner ring-side cage ring, it is possible to realize and switch between a larger number of operating modes.

According to the invention as in claim 3, the freedom of movement of the outer ring-side cage ring and the inner ring-side cage ring in the circumferential direction can be regulated by a simple configuration.

According to the invention as in claim 4, when the outer ring-side cage ring is in a position for setting the first cams in a state of being meshed to the outer ring and the inner ring, the outward projecting portion of the position regulating cage ring becomes capable of moving in the circumferential direction, whereby the outer ring-side cage ring obtains an appropriate degree of freedom with respect to the position regulating cage ring, and when the inner ring-side cage ring is in a position for setting the second cams in a state of being meshed to the outer ring and the inner ring, the inward projecting portion of the position regulating cage ring becomes capable of moving in the circumferential direction, whereby the inner ring-side cage ring obtains an appropriate degree of freedom with respect to the position regulating cage ring. As a result, appropriate meshing states of the first and second cams with respect to the outer ring and the inner ring can be realized.

According to the invention as in claim 5, by adding a function for holding the cams in the axial direction to the outer ring, the expected functions of a cam clutch can be realized reliably without an increase in the number of components.

According to the invention as in claim 6, a high degree of linkage to the outer ring-side cage ring and the inner ring-side cage ring can be maintained while providing the small cams with a large rotation angle. As a result, the cams can be reduced in size, enabling a reduction in the size of the cam clutch. Moreover, the cams can be tilted with a small amount of torque, and as a result, jamming torque can be suppressed.

According to the invention as in claim 7, the contact positions between the cams and the outer ring-side cage ring and inner ring-side cage ring can easily be adjusted, and as a result, the movable range of the cams can be enlarged while increasing the degree of linkage to the cage rings.

DESCRIPTION OF THE PREFERRED EMBODIMENTS

Figure 1:
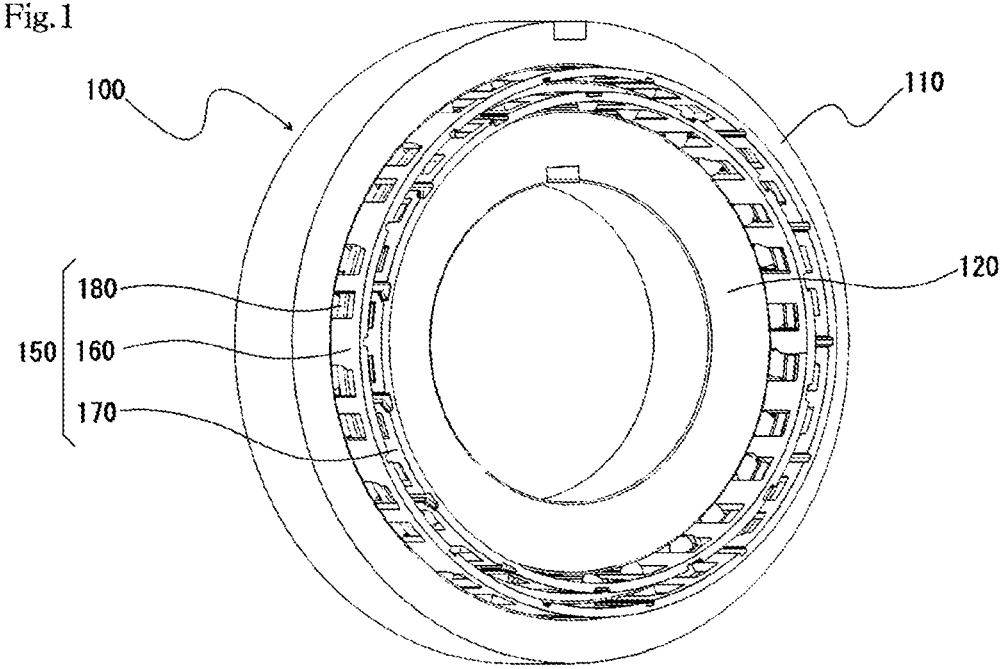
FIG. 1 is a perspective view showing an example configuration of a cam clutch of the present invention as seen from an axial direction rear side.
Figure 2:
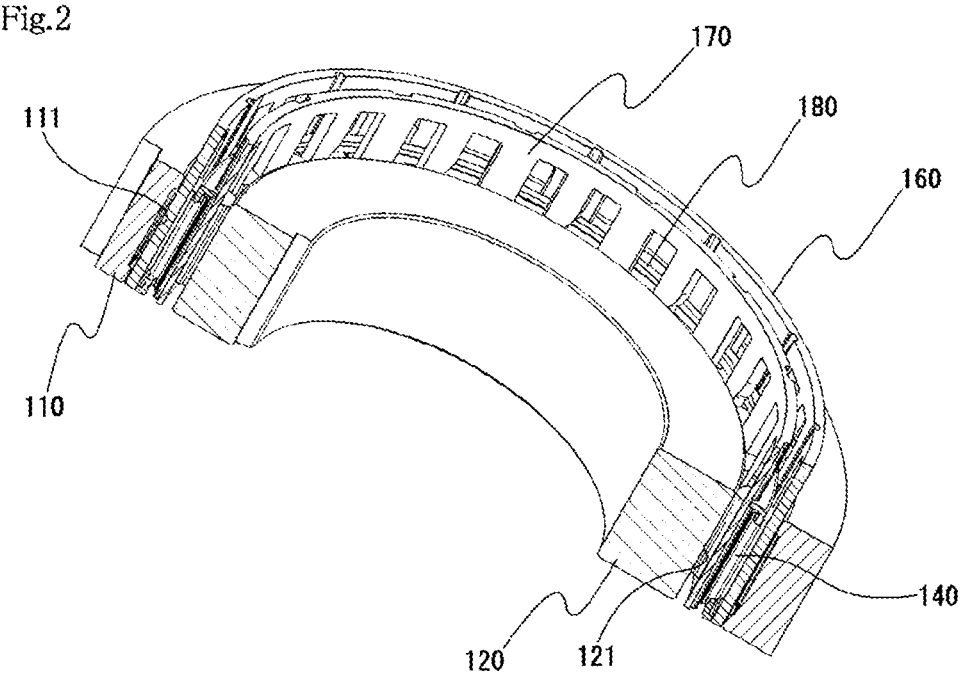
FIG. 2 is a sectional perspective view cut on a plane that includes a rotary axis of the cam clutch shown in FIG. 1.
Figure 3:
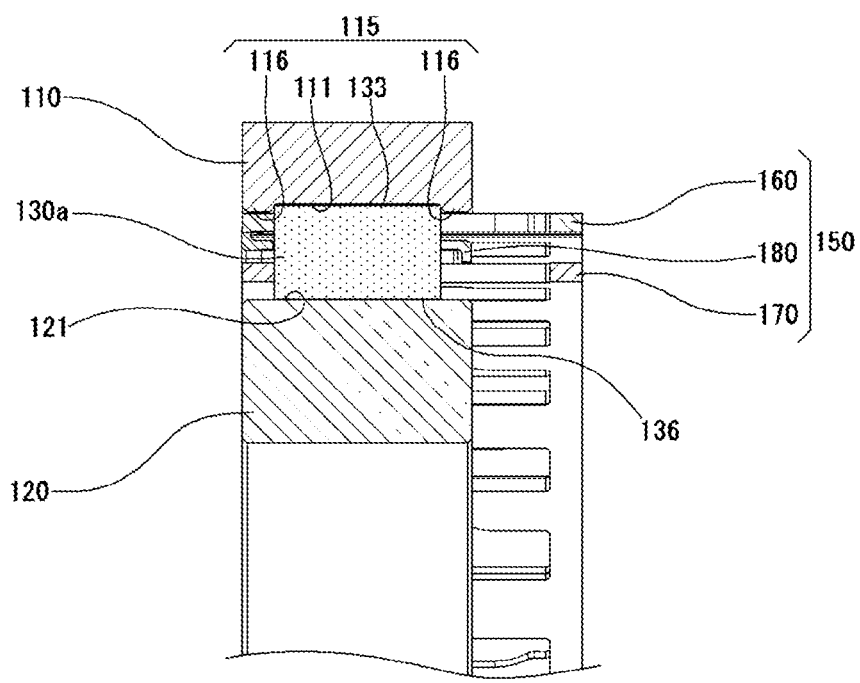
FIG. 3 is an axial sectional view showing a part of a cross-section cut on a plane that includes the rotary axis of the cam clutch shown in FIG. 1.

An embodiment of the present invention will be described with reference to FIGS. 1 to 15B.

As shown in FIGS. 1 to 4, a cam clutch 100 according to the present invention includes an outer ring 110 and an inner ring 120 provided to be capable of rotating relative to each other on an identical axis, a plurality of cams serving as engagement elements, which are arranged in a circumferential direction with intervals therebetween in an annular space between a raceway surface 111 of the outer ring 110 and a raceway surface 121 of the inner ring 120 in order to transmit and block torque between the outer ring 110 and the inner ring 120, biasing means 140 for biasing each of the plurality of cams in a meshing direction so as to contact the outer ring 110 and the inner ring 120, an outer ring-side cage ring 160 and an inner ring-side cage ring 170 that are provided between the outer ring 110 and the inner ring 120 so as to be capable of rotating together with the outer ring 110 or the inner ring 120 on the same axis, and that hold the plurality of cams, and a position regulating cage ring 180 provided between the outer ring-side cage ring 160 and the inner ring-side cage ring 170 in order to regulate the freedom of movement of the outer ring-side cage ring 160 and the inner ring-side cage ring 170 in the circumferential direction. C in FIG. 4 denotes the center of the rotary axis.

A position regulating unit 115 for regulating movement of the plurality of cams in an axial direction is provided on the outer ring 110. In this embodiment, the position regulating unit 115 is constituted by an inward rib portion 116 provided on each axial direction end portion of an inner peripheral surface of the outer ring 110 so as to project radially inward over the entirety of the circumferential direction, and by positioning the plurality of cams between the inward rib portions 116, axial direction movement of each of the plurality of cams is regulated.

The plurality of cams include first cams 130a and second cams 130b having different meshing directions with respect to the outer ring 110 and the inner ring 120.

In this embodiment, the first cams 130a and the second cams 130b are formed to have identical outer shapes, for example, and therefore a cam obtained by inverting the first cam 130a is used as the second cam 130b.

The first cams 130a and the second cams 130b are disposed so as to be arranged alternately in the circumferential direction with equal intervals therebetween, for example.

There is no particular limitation on the arrangement of the first cams 130a and the second cams 130b, and the first cams 130a and second cams 130b do not have to be disposed so as to be arranged alternately in the circumferential direction. Moreover, the number of first cams 130a may differ from the number of second cams 130b.

Figure 4:
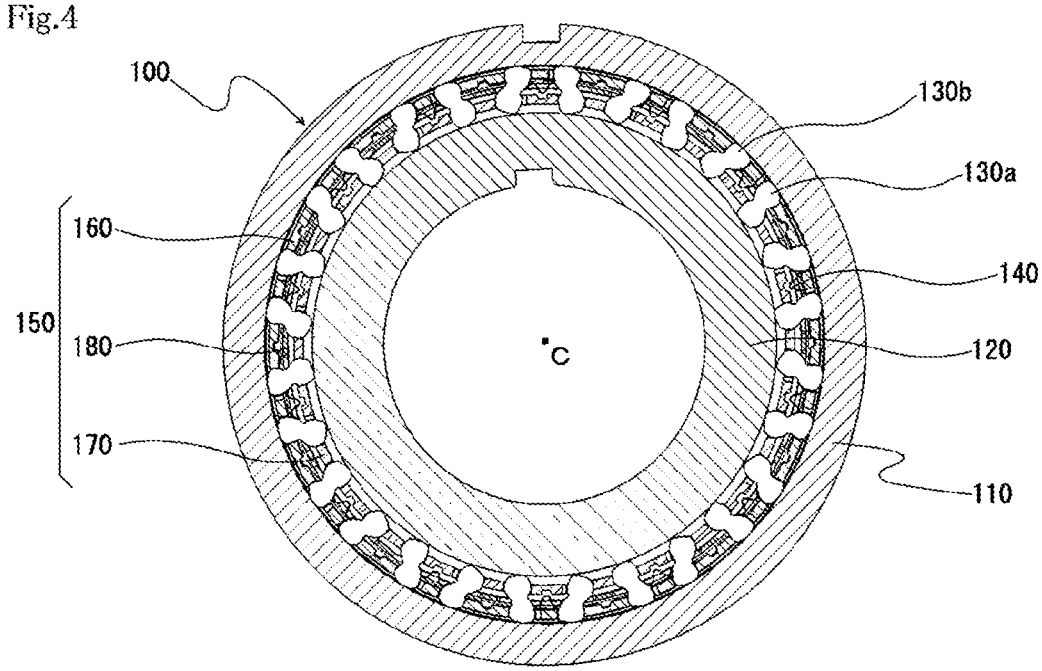
FIG. 4 is a radial sectional view cut on a plane that is orthogonal to the rotary axis of the cam clutch shown in FIG. 1 and seen from the axial direction rear side.

The meshing direction of the first cams 130a is a clockwise direction in FIG. 4 (referred to hereafter as a "forward direction"), and the first cams 130a are configured to mesh with the outer ring 110 and the inner ring 120 when either the outer ring 110 is rotated in the forward direction or the inner ring 120 is rotated in a counterclockwise direction in FIG. 4 (referred to hereafter as a "reverse direction").

The meshing direction of the second cams 130b is the reverse direction, and the second cams 130b are configured to mesh with the outer ring 110 and the inner ring 120 when either the outer ring 110 is rotated in the reverse direction or the inner ring 120 is rotated in the forward direction.

Figure 5:
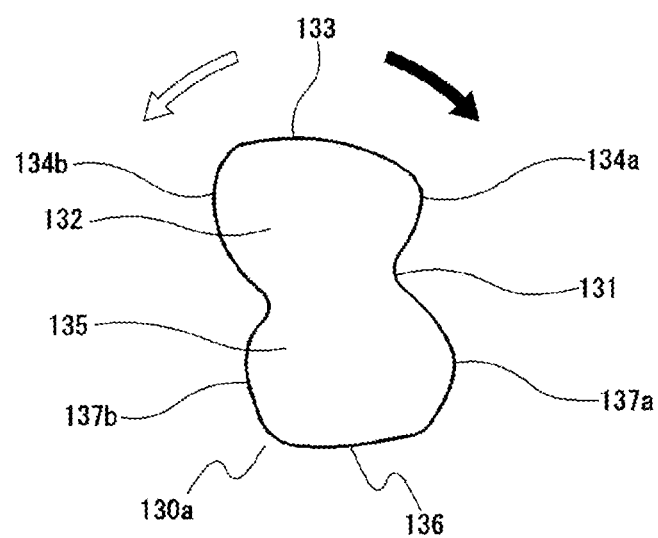
FIG. 5 is a plan view showing a configuration of a cam.

The first cams 130a and the second cams 130b have a perimeter contour shape including a curved part that extends along an involute curve on an axial direction plan view. FIG. 5 shows an example configuration of the first cam 130a. In FIG. 5, the shaded arrow indicates the meshing direction of the first cam 130a and the white arrow indicates a meshing release direction of the first cam 130a. As noted above, the second cam 130b is obtained by inverting the first cam 130a and therefore has an identical shape to the first cam 130a. Accordingly, description of the second cam 130b has been omitted.

The first cam 130a is configured to have a constricted portion 131 in a radial direction central portion thereof, and is therefore substantially gourd-shaped.

A head part 132 of the first cam 130a on the radial direction outside of the constricted portion 131 has an outer ring-side engagement surface 133, and two side surfaces 134a and 134b that are smoothly connected to the outer ring-side engagement surface 133 and contact the outer ring-side cage ring 160 are constituted by curved surfaces configured such that a width dimension of the head part 132 remains constant regardless of the attitude of the first cam 130a. More specifically, the two side surfaces 134a and 134b of the head part 132 are constituted by curves that extend along involute curves having a common base circle on an axial direction plan view.

Further, a leg part 135 of the first cam 130a on the radial direction inside of the constricted portion 131 has an inner ring-side engagement surface 136, and two side surfaces 137a and 137b that are smoothly connected to the inner ring-side engagement surface 136 and contact the inner ring-side cage ring 170 are constituted by curved surfaces configured such that a width dimension of the leg part 135 remains constant regardless of the attitude of the first cam 130a. More specifically, the two side surfaces 137a and 137b of the leg part 135 are constituted by curves that extend along involute curves having a common base circle on an axial direction plan view.

By forming the first cams 130a and the second cams 130b to have this perimeter contour shape, the first cams 130a and second cams 130b can maintain a high degree of linkage to the outer ring-side cage ring 160 and the inner ring-side cage ring 170, and at the same time, the small cams can be provided with a large rotation angle. As a result, the cams can be reduced in size, enabling a reduction in the size of the cam clutch 100. Moreover, the cams can be tilted with a small amount of torque, and as a result, jamming torque can be suppressed.

The biasing means 140 is constituted by a ribbon spring, for example. The biasing means 140 may be any elastic body capable of biasing the first cams 130a and the second cams 130b in the meshing direction, and a plurality of leaf springs, torsion springs, or the like, for example, may also be used.

Figure 6:
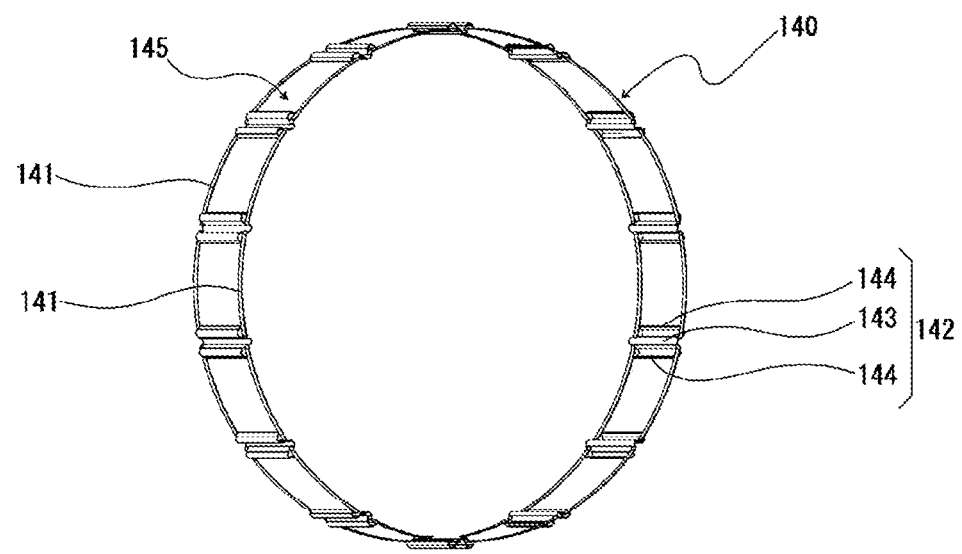
FIG. 6 is a perspective view showing a configuration of biasing means provided in the cam clutch shown in FIG. 1, as seen from the axial direction rear side.

As shown in FIG. 6, for example, the ribbon spring used as the biasing means 140 is constituted by a pair of annular portions 141 extending parallel to each other in the circumferential direction, and a plurality of connecting portions 142 for connecting the annular portions 141 in the axial direction at predetermined intervals, and pocket portions 145, each of which is capable of accommodating one first cam 130a and one second cam 130b, are formed from the spaces between adjacent connecting portions 142. The pocket portions 145 are provided at equal intervals in the circumferential direction.

The connecting portion 142 includes an arc-shaped curved portion 143 formed so as to project inward in the radial direction, and pressing arm portions 144 that are formed so as to project outward in the radial direction and respectively connected to the two ends of the arc-shaped curved portion 143. Thus, the connecting portion 142 is configured to bias the first cams 130a and the second cams 130*b* in the meshing direction with respect to the outer ring 110 and the inner ring 120 using the pressing arm portions 144.

The cam clutch 100 according to this embodiment can be switched between four operating modes by an operating mode switching mechanism 150, the four operating modes being a forward direction lock mode in which relative rotation of the outer ring 110 and the inner ring 120 in the forward direction is prohibited, a reverse direction lock mode in which relative rotation of the outer ring 110 and the inner ring 120 in the reverse direction is prohibited, a two-direction lock mode in which relative rotation of the outer ring 110 and the inner ring 120 in both the forward direction and the reverse direction is prohibited, and a two-direction free mode in which relative rotation of the outer ring 110 and the inner ring 120 in both the forward direction and the reverse direction is permitted.

In this embodiment, the operating mode switching mechanism 150 is constituted by the outer ring-side cage ring 160, the inner ring-side cage ring 170, and the position regulating cage ring 180.

Figure 7A:
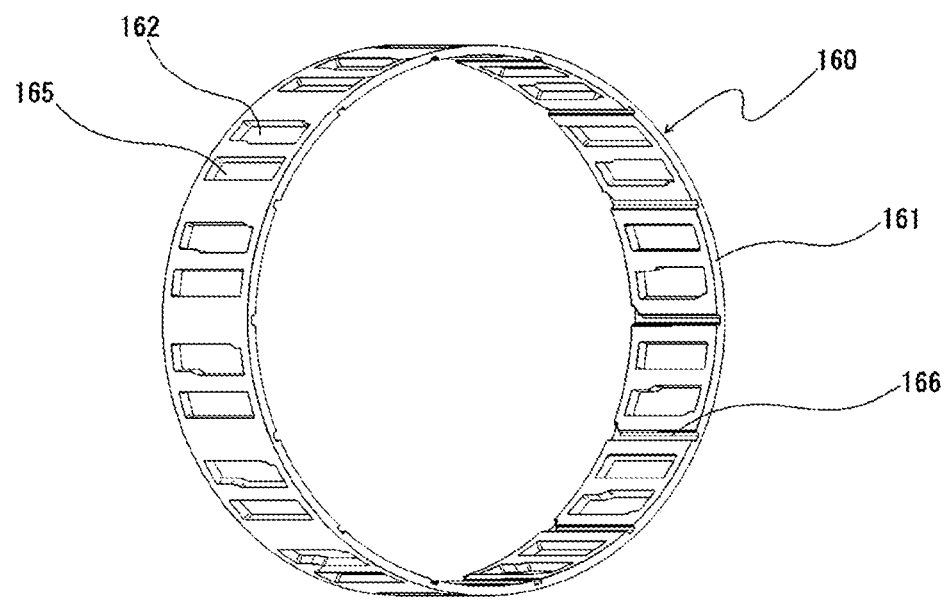
FIG. 7A is a perspective view showing a configuration of an outer ring-side cage ring as seen from the axial direction rear side.
Figure 7B:
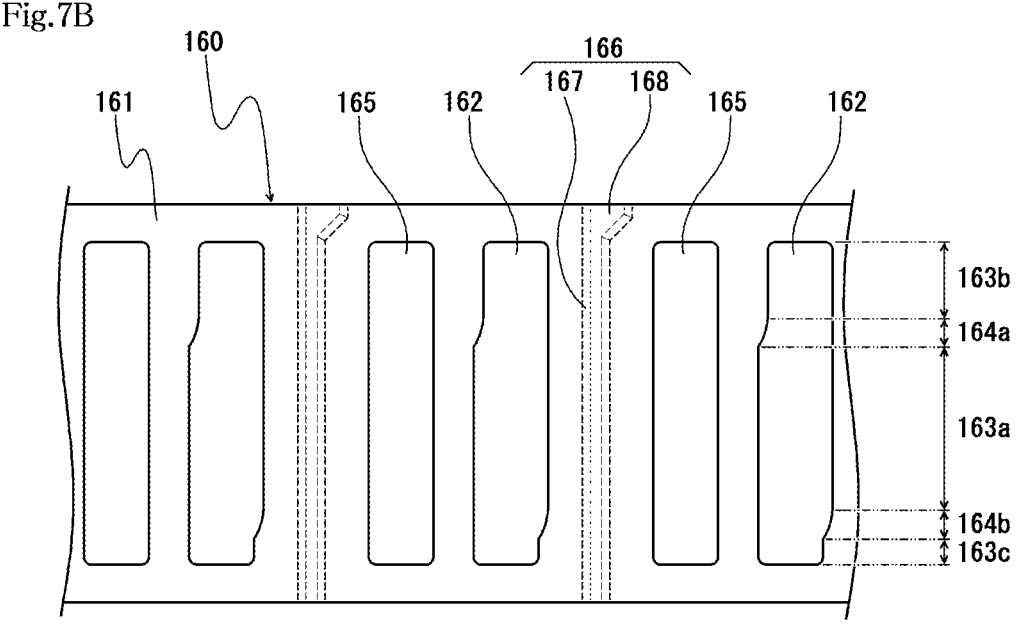
FIG. 7B is a partially developed view of the outer ring-side cage ring shown in FIG. 7A.

As shown in FIGS. 7A and 7B, the outer ring-side cage ring 160 includes a cylindrical body portion 161 that extends in the axial direction. First cam holding portions 162 for receiving the head parts 132 of the first cams 130*a* and holding the first cams 130*a* and second cam holding portions 165 for receiving the head parts of the second cams 130*b* and holding the second cams 130*b* are provided on the body portion 161 so as to be arranged alternately in the circumferential direction.

Each of the first cam holding portions 162 of the outer ring-side cage ring 160 is configured to include an opening width varying portion having an opening width that varies continuously in the axial direction.

More specifically, the first cam holding portion 162 includes a guiding space portion 163*a* configured to have a constant opening width in the axial direction, a first attitude-fixing space portion 163*b* that is configured to have a smaller opening width than the guiding space portion 163*a* and is connected to an axial direction front side (the upper side in FIG. 7B) of the guiding space portion 163*a*, and a second attitude-fixing space portion 163*c* that is configured to have a smaller opening width than the guiding space portion 163*a* and is connected to an axial direction rear side (the lower side in FIG. 7B) of the guiding space portion 163*a*. The first attitude-fixing space portion 163*b* is connected to the guiding space portion 163*a* via a first opening width varying portion 164*a* formed such that the opening width thereof decreases continuously toward the axial direction front side, and the second attitude-fixing space portion 163*c* is connected to the guiding space portion 163*a* via a second opening width varying portion 164*b* formed such that the opening width thereof decreases continuously toward the axial direction rear side. The first opening width varying portion 164*a* is formed by forming an opening edge on the side of the meshing release direction (the leftward direction in FIG. 7B) of the first cams 130*a* to project inward, and the second opening width varying portion 164*b* is formed by forming an opening edge on the side of the meshing direction (the rightward direction in FIG. 7B) of the first cams 130*a* to project inward.

The second cam holding portion 165 of the outer ring-side cage ring 160 is rectangular and configured to have a constant opening width in the axial direction.

The outer ring-side cage ring 160 is provided to be capable of moving in the axial direction independently of the rotation operations of the outer ring 110 and the inner ring 120, and as a result, the first cams 130*a* can be tilted so as to modify the attitude of the first cams 130*a* while maintaining the attitude of the second cams 130*b*.

By forming the first cam holding portions 162 of the outer ring-side cage ring 160 from irregularly shaped opening windows having a narrowed opening width at each axial direction end in this manner rather than from simple rectangular opening portions, it is possible to release slight jamming caused by a manufacturing error or the like with a small amount of thrust, and by appropriately modifying the opening shape of the first cam holding portions 162, it is possible to realize and switch between a larger number of operating modes.

An inner surface groove portion 166 that extends in the axial direction is formed in an inner surface of the body portion 161 of the outer ring-side cage ring 160 between each first cam holding portion 162 and the second cam holding portion 165 that is adjacent to the first cam holding portion 162 in the meshing direction of the first cams 130*a*.

The inner surface groove portions 166 each include a guiding groove portion 167 that extends in a straight line from an axial direction rear end edge to an axial direction front end edge of the body portion 161, and a sliding groove portion 168 connected to an axial direction front end portion of the guiding groove portion 167. The sliding groove portions 168 are formed in the circumferential direction so as to extend in the meshing direction of the first cams 130*a*, and are configured such that when the outer ring-side cage ring 160 is in a position for setting the first cams 130*a* in a meshed state, circumferential direction movement of outward projecting portions 185 of the position regulating cage ring 180, to be described below, is permitted.

Figure 8A:
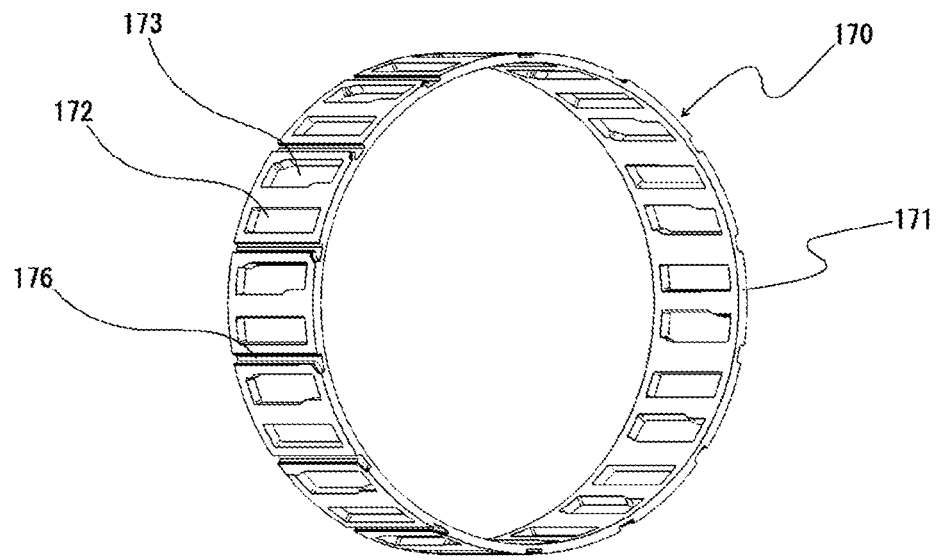
FIG. 8A is a perspective view showing a configuration of an inner ring-side cage ring as seen from the axial direction rear side.
Figure 8B:
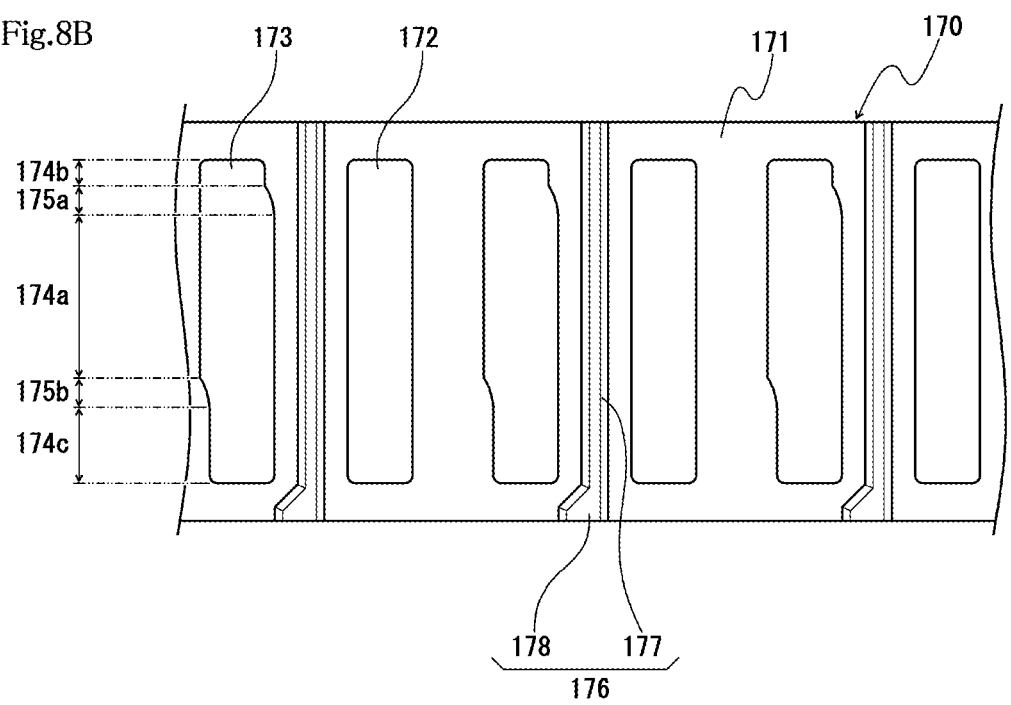
FIG. 8B is a partially developed view of the inner ring-side cage ring shown in FIG. 8A.

As shown in FIGS. 8A and 8B, the inner ring-side cage ring 170 includes a cylindrical body portion 171 that extends in the axial direction. First cam holding portions 172 for receiving the leg parts 135 of the first cams 130*a* and holding the first cams 130*a* and second cam holding portions 173 for receiving the leg parts of the second cams 130*b* and holding the second cams 130*b* are provided on the body portion 171 so as to be arranged alternately in the circumferential direction.

The first cam holding portions 172 of the inner ring-side cage ring 170 are rectangular and configured to have a constant opening width in the axial direction.

Each of the second cam holding portions 173 of the inner ring-side cage ring 170 is configured to include an opening width varying portion having an opening width that varies continuously in the axial direction.

More specifically, the second cam holding portion 173 includes a guiding space portion 174*a* configured to have a constant opening width in the axial direction, a first attitude-fixing space portion 174*b* that is configured to have a smaller opening width than the guiding space portion 174*a* and is connected to an axial direction front side (the upper side in FIG. 8B) of the guiding space portion 174*a*, and a second attitude-fixing space portion 174*c* that is configured to have a smaller opening width than the guiding space portion 174*a* and is connected to an axial direction rear side (the lower side in FIG. 8B) of the guiding space portion 174*a*. The first attitude-fixing space portion 174*b* is connected to the guiding space portion 174*a* via a first opening width varying portion 175*a* formed such that the opening width thereof decreases continuously toward the axial direction front side, and the second attitude-fixing space portion 174*c* is connected to the guiding space portion 174*a* via a second opening width varying portion 175*b* formed such that the opening width thereof decreases continuously toward the axial direction rear side. The first opening width varying portion 175a is formed by forming an opening edge on the side of the meshing release direction (the rightward direction in FIG. 8B) of the second cams 130b to project inward, and the second opening width varying portion 175b is formed by forming an opening edge on the side of the meshing direction (the leftward direction in FIG. 8B) of the second cams 130b to project inward.

The inner ring-side cage ring 170 is provided to be capable of moving in the axial direction independently of the rotation operations of the outer ring 110 and the inner ring 120, and as a result, the second cams 130b can be tilted so as to modify the attitude of the second cams 130b while maintaining the attitude of the first cams 130a.

By forming the second cam holding portions 173 of the inner ring-side cage ring 170 from irregularly shaped opening windows having a narrowed opening width at each axial direction end in this manner rather than from simple rectangular opening portions, it is possible to release slight jamming caused by a manufacturing error or the like with a small amount of thrust, and by appropriately modifying the opening shape of the second cam holding portion 173, it is possible to realize and switch between a larger number of operating modes.

An outer surface groove portion 176 that extends in the axial direction is formed in an outer surface of the body portion 171 of the inner ring-side cage ring 170 between each second cam holding portion 173 and the first cam holding portion 172 that is adjacent to the second cam holding portion 173 in the meshing release direction of the second cams 130b.

The outer surface groove portions 176 each include a guiding groove portion 177 that extends in a straight line from an axial direction front end edge to an axial direction rear end edge of the body portion 171, and a sliding groove portion 178 connected to an axial direction rear end portion of the guiding groove portion 177. The sliding groove portions 178 are formed in the circumferential direction so as to extend in the meshing direction of the second cams 130b, and are configured such that when the inner ring-side cage ring 170 is in a position for setting the second cams 130b in a meshed state, circumferential direction movement of inward projecting portions 186 of the position regulating cage ring 180, to be described below, is permitted.

As described above, the operating mode switching mechanism 150 of the cam clutch 100 according to this embodiment is configured to include the position regulating cage ring 180 for regulating the freedom of movement of the outer ring-side cage ring 160 and the inner ring-side cage ring 170 in the circumferential direction. Accordingly, the freedom of movement of the outer ring-side cage ring 160 and the inner ring-side cage ring 170 in the circumferential direction relative to the position regulating cage ring 180 can be adjusted to an appropriate degree of freedom corresponding to each operating mode, and as a result, the first cams 130a and second cams 130b can be held in appropriate attitudes.

Figure 9A:
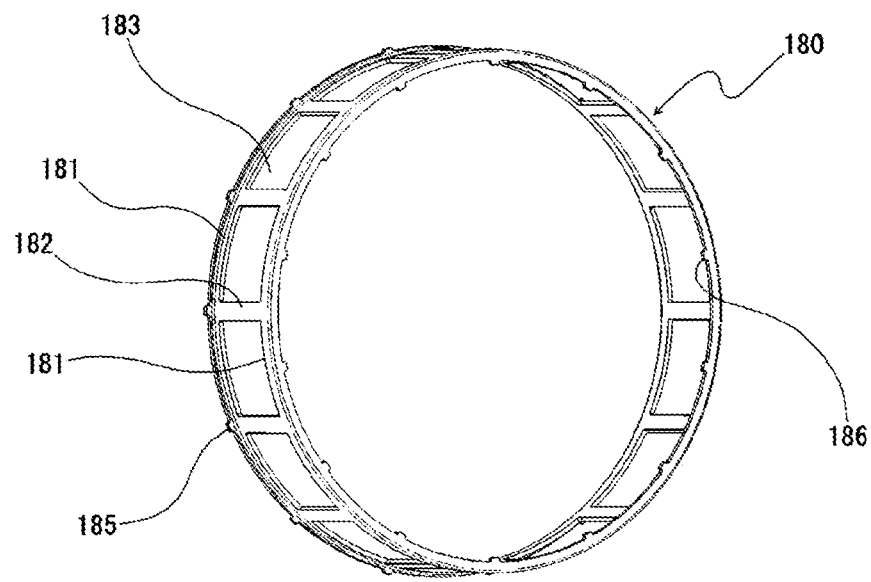
FIG. 9A is a perspective view showing a configuration of a position regulating cage ring as seen from the axial direction rear side.
Figure 9B:
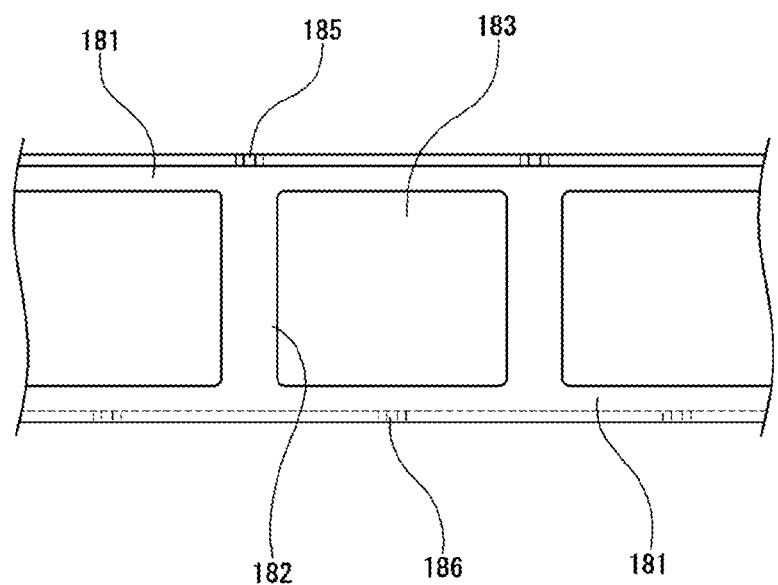
FIG. 9B is a partially developed view of the position regulating cage ring shown in FIG. 9A.

As shown in FIGS. 9A and 9B, the position regulating cage ring 180 is constituted by a pair of annular portions 181 extending parallel to each other in the circumferential direction, and a plurality of connecting portions 182 for connecting the annular portions 181 in the axial direction at predetermined intervals, and pocket portions 183, each of which is capable of accommodating one first cam 130a and one second cam 130b, are formed from the spaces between adjacent connecting portions 182. The pocket portions 183 are provided at equal intervals in the circumferential direction.

The position regulating cage ring 180 includes the outward projecting portions 185, which are provided on an axial direction front end portion thereof so as to project radially outward and engage with the inner surface groove portions 166 of the outer ring-side cage ring 160 so as to be capable of sliding, and the inward projecting portions 186, which are provided on an axial direction rear end portion thereof so as to project radially inward and engage with the outer surface groove portions 176 of the inner ring-side cage ring 170 so as to be capable of sliding.

Operations of the cam clutch 100 according to this embodiment will be described below.

Figure 10A:
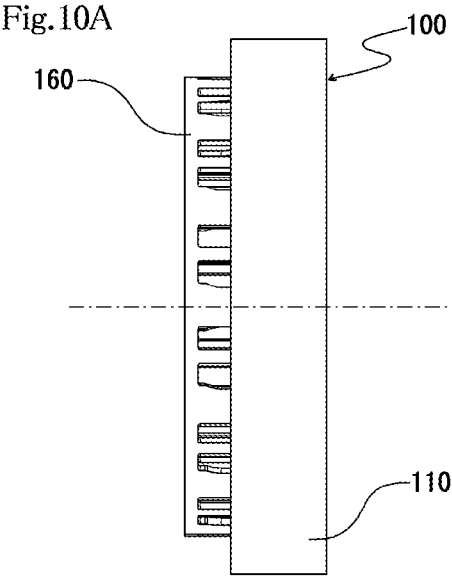
FIG. 10A is a side view showing a state established when an operating mode of the cam clutch shown in FIG. 1 is set in a forward direction lock mode.
Figure 11A:
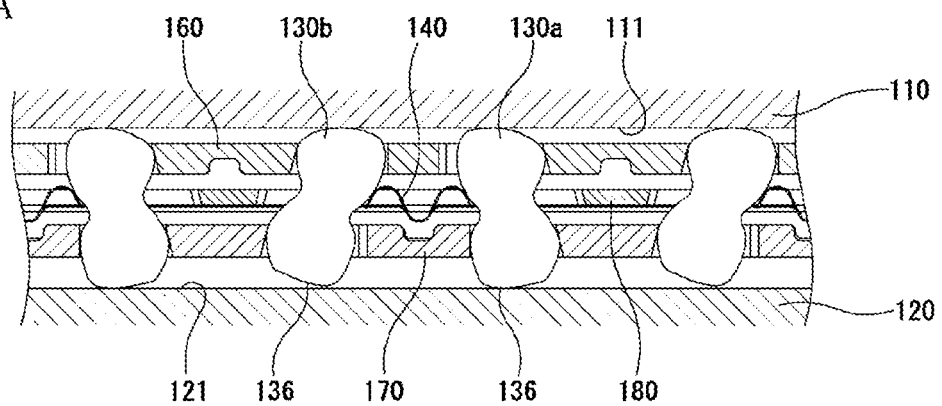
FIG. 11A is a schematic view showing the state of the cam when the operating mode of the cam clutch shown in FIG. 1 is set in the forward direction lock mode.

First, when the outer ring-side cage ring 160 and the inner ring-side cage ring 170 are both positioned on the axial direction rear side, as shown in FIG. 10A, the first cams 130a are maintained in a meshing standby state, as shown in FIG. 11A, in which the first cams 130a start meshing with the outer ring 110 and the inner ring 120 as soon as torque acts on the outer ring 110 or the inner ring 120. The second cams 130b, meanwhile, are maintained in a state where the inner ring-side engagement surfaces 136 are separated from the raceway surface 121 of the inner ring 120, and therefore the cam clutch 100 is set in the forward direction lock mode in which relative rotation of the outer ring 110 and the inner ring 120 in the forward direction is prohibited.

Figure 10B:
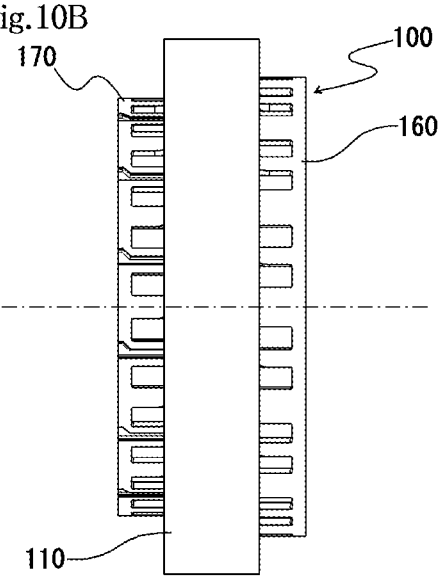
FIG. 10B is a side view showing a state established when the operating mode of the cam clutch shown in FIG. 1 has been switched from the forward direction lock mode to a two-direction free mode.
Figure 11B:
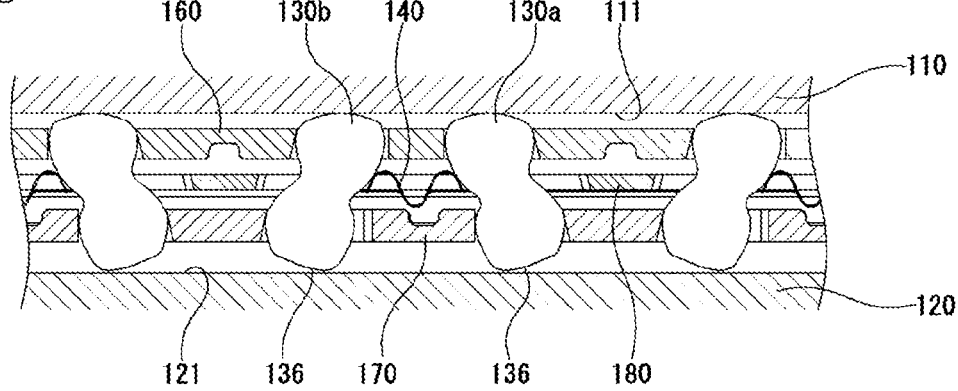
FIG. 11B is a schematic view showing the state of the cam when the operating mode of the cam clutch shown in FIG. 1 has been switched from the forward direction lock mode to the two-direction free mode.

As shown in FIG. 10B, for example, when the outer ring-side cage ring 160 is moved toward the axial direction front side, the head parts 132 of the first cams 130a are pressed by the action of the second opening width varying portions 164b in the first cam holding portions 162 of the outer ring-side cage ring 160, as shown in FIG. 11B. As a result, the first cams 130a are tilted in the meshing release direction, whereby the attitudes of the first cams 130a are held in a state where the inner ring-side engagement surfaces 136 of the first cams 130a are separated from the raceway surface 121 of the inner ring 120.

Meanwhile, the second cam holding portions 165 of the outer ring-side cage ring 160 are formed in a rectangular shape with a constant opening width in the axial direction, and moreover, the freedom of the outer ring-side cage ring 160 and the inner ring-side cage ring 170 in the circumferential direction is regulated by the position regulating cage ring 180. Therefore, the attitudes of the second cams 130b are held in a state where the inner ring-side engagement surfaces 136 are separated from the raceway surface 121 of the inner ring 120.

Thus, the operating mode of the cam clutch 100 is switched from the forward direction lock mode to the two-direction free mode in which relative rotation of the outer ring 110 and the inner ring 120 in both the forward direction and the reverse direction is permitted.

Note that in FIGS. 11A and 11B, for convenience, the raceway surface 111 of the outer ring 110 and the raceway surface 121 of the inner ring 120 are shown on parallel planes.

Conversely, when the operating mode of the cam clutch 100 is switched from the two-direction free mode to the forward direction lock mode, the outer ring-side cage ring 160 is moved toward the axial direction rear side. Accordingly, the head parts 132 of the first cams 130a are pressed by the action of the first opening width varying portions 164a in the first cam holding portions 162 of the outer ring-side cage ring 160, and as a result, the first cams 130a are tilted in the meshing direction, whereby the first cams 130*a* are held in the meshing standby state in which the first cams 130*a* start meshing with the outer ring 110 and the inner ring 120 as soon as torque acts on the outer ring 110 or the inner ring 120. At this time, the inner surface groove portions 166 of the outer ring-side cage ring 160 include the sliding groove portions 168, and therefore circumferential direction movement of the outward projecting portions 185 of the position regulating cage ring 180 is permitted. Accordingly, the freedom of movement of the outer ring-side cage ring 160 in the circumferential direction relative to the position regulating cage ring 180 is adjusted to an appropriate degree of freedom, whereby the first cams 130*a* are held in an appropriate attitude.

Meanwhile, the attitudes of the second cams 130*b* are held in the state described above, in which the inner ring-side engagement surfaces 136 are separated from the raceway surface 121 of the inner ring 120.

Thus, the operating mode of the cam clutch 100 is switched from the two-direction free mode to the forward direction lock mode.

Figure 12A:
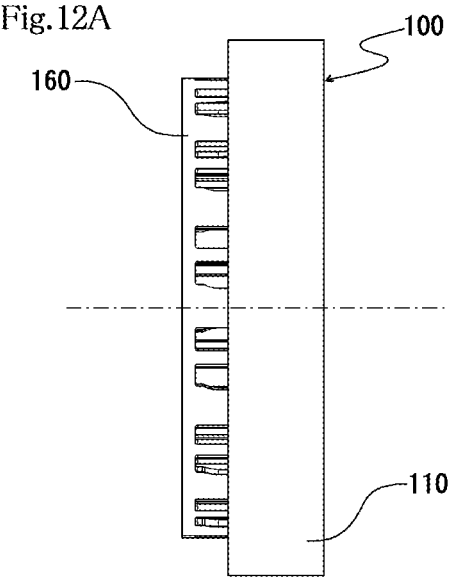
FIG. 12A is a side view showing the state established when the operating mode of the cam clutch shown in FIG. 1 is set in the forward direction lock mode.
Figure 12B:
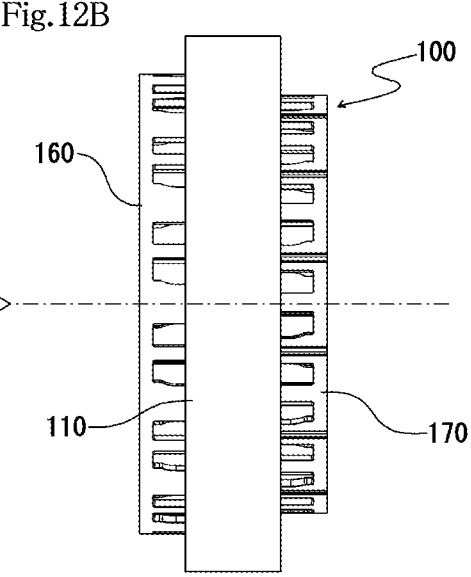
FIG. 12B is a side view showing a state established when the operating mode of the cam clutch shown in FIG. 1 has been switched from the forward direction lock mode to a two-direction lock mode.
Figure 13A:
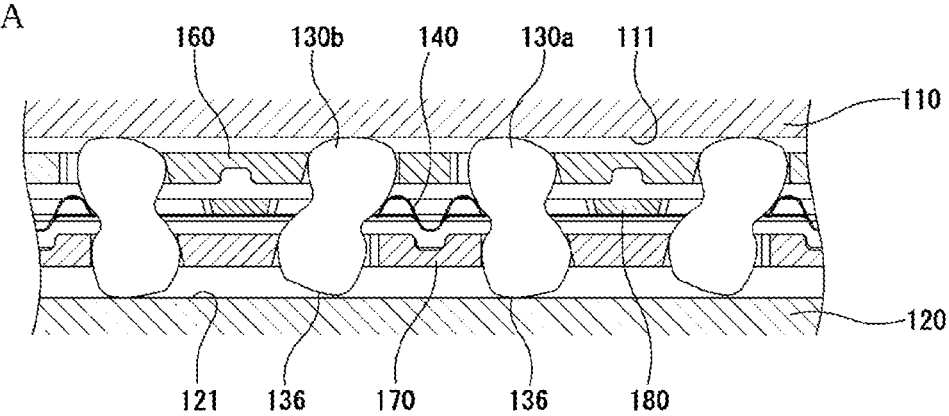
FIG. 13A is a schematic view showing the state of the cam when the operating mode of the cam clutch shown in FIG. 1 is set in the forward direction lock mode.
Figure 13B:
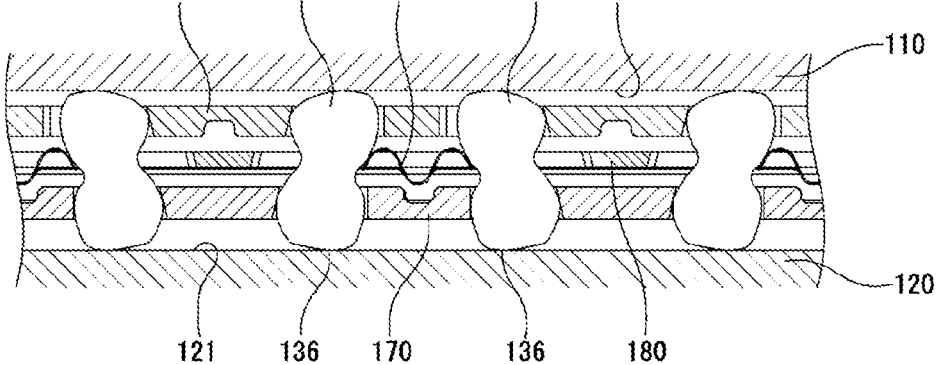
FIG. 13B is a schematic view showing the state of the cam when the operating mode of the cam clutch shown in FIG. 1 has been switched from the forward direction lock mode to the two-direction lock mode.

Furthermore, when the inner ring-side cage ring 170 is moved toward the axial direction front side, as shown in FIG. 12B, from a state in which the operating mode of the cam clutch 100 is set in the forward direction lock mode shown in FIGS. 12A and 13A, the leg parts 135 of the second cams 130*b* are pressed by the action of the second opening width varying portions 175*b* in the second cam holding portions 173 of the inner ring-side cage ring 170, as shown in FIG. 13B. As a result, the second cams 130*b* are tilted in the meshing direction, whereby the second cams 130*b* are held in the meshing standby state in which the second cams 130*b* start meshing with the outer ring 110 and the inner ring 120 as soon as torque acts on the outer ring 110 or the inner ring 120. At this time, the outer surface groove portions 176 of the inner ring-side cage ring 170 include the sliding groove portions 178, and therefore circumferential direction movement of the inward projecting portions 186 of the position regulating cage ring 180 is permitted. Accordingly, the freedom of movement of the inner ring-side cage ring 170 in the circumferential direction relative to the position regulating cage ring 180 is adjusted to an appropriate degree of freedom, whereby the second cams 130*b* are held in an appropriate attitude.

Meanwhile, the first cam holding portions 172 of the inner ring-side cage ring 170 are formed in a rectangular shape having a constant opening width in the axial direction, and therefore the attitudes of the first cams 130*a* are held in the meshing standby state in which the first cams 130*a* start meshing with the outer ring 110 and the inner ring 120 as soon as torque acts on the outer ring 110 or the inner ring 120.

Thus, the operating mode of the cam clutch 100 is switched from the forward direction lock mode to the two-direction lock mode in which relative rotation of the outer ring 110 and the inner ring 120 in both the forward direction and the reverse direction is prohibited.

Conversely, when the operating mode of the cam clutch 100 is switched from the two-direction lock mode to the forward direction lock mode, the inner ring-side cage ring 170 is moved toward the axial direction rear side. Accordingly, the leg parts 135 of the second cams 130*b* are pressed by the action of the first opening width varying portions 175*a* in the second cam holding portions 173 of the inner ring-side cage ring 170, and as a result, the second cams 130*b* are tilted in the meshing release direction, whereby the attitudes of the second cams 130*b* are held in the state in which the inner ring-side engagement surfaces 136 of the second cams 130*b* are separated from the raceway surface 121 of the inner ring 120.

Meanwhile, the attitudes of the first cams 130*a* are held in the meshing standby state described above, in which the first cams 130*a* start meshing with the outer ring 110 and the inner ring 120 as soon as torque acts on the outer ring 110 or the inner ring 120.

Thus, the operating mode of the cam clutch 100 is switched from the two-direction lock mode to the forward direction lock mode.

Figure 14A:
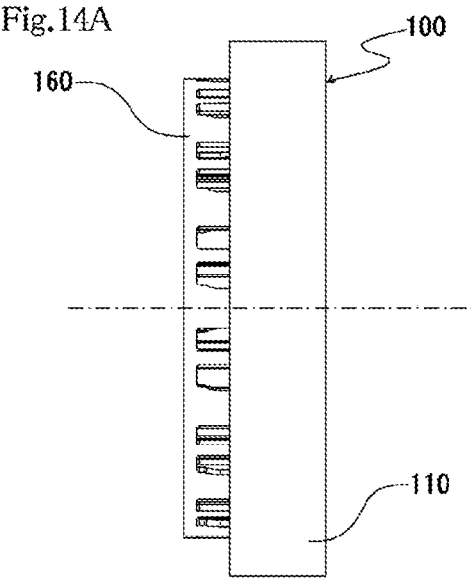
FIG. 14A is a side view showing the state established when the operating mode of the cam clutch shown in FIG. 1 is set in the forward direction lock mode.
Figure 14B:
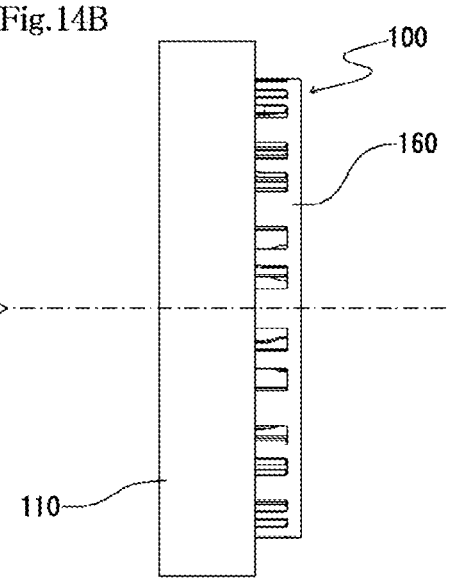
FIG. 14B is a side view showing a state established when the operating mode of the cam clutch shown in FIG. 1 has been switched from the forward direction lock mode to a reverse direction lock mode.
Figure 15A:
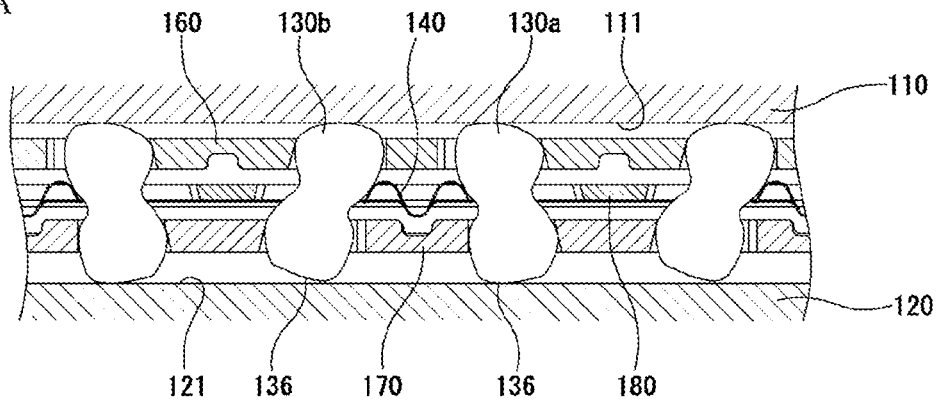
FIG. 15A is a schematic view showing the state of the cam when the operating mode of the cam clutch shown in FIG. 1 is set in the forward direction lock mode.
Figure 15B:
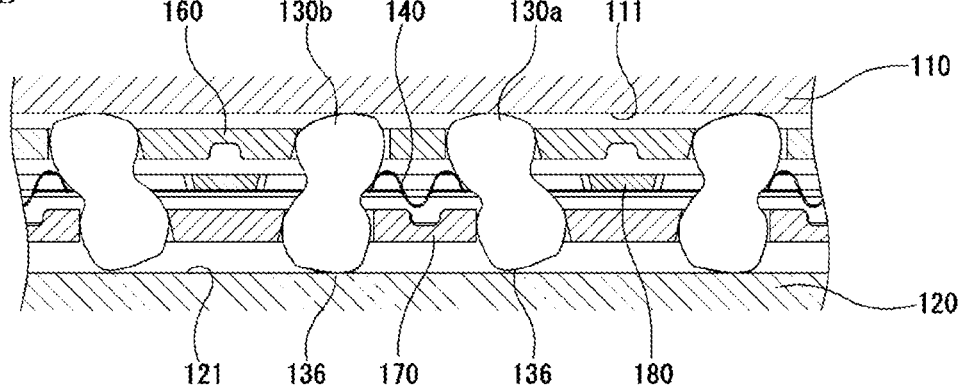
FIG. 15B is a schematic view showing the state of the cam when the operating mode of the cam clutch shown in FIG. 1 has been switched from the forward direction lock mode to the reverse direction lock mode.

Moreover, when the outer ring-side cage ring 160 and the inner ring-side cage ring 170 are both moved toward the axial direction front side, as shown in FIG. 14B, from a state in which the operating mode of the cam clutch 100 is set in the forward direction lock mode shown in FIGS. 14A and 15A, the head parts 132 of the first cams 130*a* are pressed by the action of the second opening width varying portions 164*b* in the first cam holding portions 162 of the outer ring-side cage ring 160, as shown in FIG. 15B. As a result, the first cams 130*a* are tilted in the meshing release direction, whereby the attitudes of the first cams 130*a* are held in the state where the inner ring-side engagement surfaces 136 of the first cams 130*a* are separated from the raceway surface 121 of the inner ring 120.

Meanwhile, the leg parts 135 of the second cams 130*b* are pressed by the action of the second opening width varying portions 175*b* in the second cam holding portions 173 of the inner ring-side cage ring 170. As a result, the second cams 130*b* are tilted in the meshing direction, whereby the second cams 130*b* are held in the meshing standby state in which the second cams 130*b* start meshing with the outer ring 110 and the inner ring 120 as soon as torque acts on the outer ring 110 or the inner ring 120. At this time, as described above, the freedom of movement of the inner ring-side cage ring 170 in the circumferential direction relative to the position regulating cage ring 180 is adjusted to an appropriate degree of freedom, and therefore the second cams 130*b* are held in an appropriate attitude.

Thus, the operating mode of the cam clutch 100 is switched from the forward direction lock mode to the reverse direction lock mode in which relative rotation of the outer ring 110 and the inner ring 120 in the reverse direction is prohibited.

Conversely, when the operating mode of the cam clutch 100 is switched from the reverse direction lock mode to the forward direction lock mode, the outer ring-side cage ring 160 and the inner ring-side cage ring 170 are both moved toward the axial direction rear side. Accordingly, the head parts 132 of the first cams 130*a* are pressed by the action of the first opening width varying portions 164*a* in the first cam holding portions 162 of the outer ring-side cage ring 160, and as a result, the first cams 130*a* are tilted in the meshing direction, whereby the first cams 130*a* are held in the meshing standby state in which the first cams 130*a* start meshing with the outer ring 110 and the inner ring 120 as soon as torque acts on the outer ring 110 or the inner ring 120. At this time, as described above, the freedom of movement of the outer ring-side cage ring 160 in the circumferential direction relative to the position regulating cage ring 180 is adjusted to an appropriate degree of freedom, and therefore the first cams 130*a* are held in an appropriate attitude.

Meanwhile, the leg parts 135 of the second cams 130*b* are pressed by the action of the first opening width varying portions 175*a* in the second cam holding portions 173 of the inner ring-side cage ring 170, and as a result, the second cams 130b are tilted in the meshing release direction, whereby the attitudes of the second cams 130b are held in the state where the inner ring-side engagement surfaces 136 of the second cams 130b are separated from the raceway surface 121 of the inner ring 120.

Thus, the operating mode of the cam clutch 100 is switched from the reverse direction lock mode to the forward direction lock mode.

In the cam clutch 100 according to this embodiment, as described above, by providing the outer ring-side cage ring 160 with a function for controlling the attitude of the first cams 130a, providing the inner ring-side cage ring 170 with a function for controlling the attitude of the second cams 130b, and regulating the freedom of the outer ring-side cage ring 160 and the inner ring-side cage ring 170 using the position regulating cage ring 180, the first cams 130a and/or the second cams 130b can be tilted and held in a modified attitude simply by moving one or both of the outer ring-side cage ring 160 and the inner ring-side cage ring 170 in the axial direction. Hence, the cam clutch 100 can be configured to have a simple structure and high functionality compatible with four operating modes.

Further, by regulating the freedom of the outer ring-side cage ring 160 and the inner ring-side cage ring 170, the occurrence of jamming, in which both the first cams 130a and the second cams 130b mesh with the outer ring 110 and the inner ring 120, can be avoided when modifying the attitudes of the cams, and as a result, smooth operations can be realized and a high degree of responsiveness can be obtained.

An embodiment of the present invention was described in detail above, but the present invention is not limited to the above embodiment, and various design changes may be implemented without departing from the scope of the present invention, described in the claims.

In the configuration described in the above embodiment, the operating mode of the cam clutch is set in the forward direction lock mode when the outer ring-side cage ring and the inner ring-side cage ring are positioned on the axial direction rear side, but there is no particular limitation on the relationship between the operating mode of the cam clutch and the axial direction positions of the outer ring-side cage ring and the inner ring-side cage ring. For example, the operating mode of the cam clutch may be set in the two-direction free mode, the two-direction lock mode, or the reverse direction lock mode when the outer ring-side cage ring and the inner ring-side cage ring are positioned on the axial direction rear side.

Further, in the configuration described in the above embodiment, the first cams and/or the second cams are separated from the inner ring in all operating modes other than the two-direction lock mode, but the cams may be separated from the outer ring instead.

What is claimed is:

1. A cam clutch comprising an outer ring and an inner ring provided to be capable of rotating relative to each other on an identical rotary axis, a plurality of cams arranged in a circumferential direction between the outer ring and the inner ring, and biasing means for biasing each of the plurality of cams so as to contact the outer ring and the inner ring, wherein the plurality of cams include first cams and second cams having different meshing directions with respect to the outer ring and the inner ring, the cam clutch comprises an operating mode switching mechanism for switching an operating mode of the cam clutch, and the operating mode switching mechanism comprises an outer ring-side cage ring provided to be capable of moving in an axial direction independently of rotation operations of the outer ring and the inner ring and configured to be capable of modifying the attitude of the first cams, an inner ring-side cage ring provided to be capable of moving in the axial direction independently of the rotation operations of the outer ring and the inner ring and configured to be capable of modifying the attitude of the second cams, and a position regulating cage ring provided between the outer ring-side cage ring and the inner ring-side cage ring in order to regulate the freedom of movement of the outer ring-side cage ring and the inner ring-side cage ring in the circumferential direction.

2. The cam clutch according to claim 1, wherein the outer ring-side cage ring and the inner ring-side cage ring each include a first cam holding portion for holding the first cams and a second cam holding portion for holding the second cams, the second cam holding portion of the outer ring-side cage ring and the first cam holding portion of the inner ring-side cage ring are configured to have a constant opening width in the axial direction, and the first cam holding portion of the outer ring-side cage ring and the second cam holding portion of the inner ring-side cage ring are configured to have an opening width varying portion with an opening width that varies continuously in the axial direction.

3. The cam clutch according to claim 1, wherein an inner surface groove portion that extends in the axial direction is provided in an inner surface of the outer ring-side cage ring, an outer surface groove portion that extends in the axial direction is provided in an outer surface of the inner ring-side cage ring, and the position regulating cage ring has an outward projecting portion that is provided on one axial direction end portion so as to project radially outward and engages with the inner surface groove portion of the outer ring-side cage ring so as to be capable of sliding, and an inward projecting portion that is provided on the other axial direction end portion so as to project radially inward and engages with the outer surface groove portion of the inner ring-side cage ring so as to be capable of sliding.

4. The cam clutch according to claim 3, wherein the inner surface groove portion includes a sliding groove portion that is provided so as to extend in the circumferential direction and allows the outward projecting portion to move in the circumferential direction when the outer ring-side cage ring is in a position for setting the first cams in a meshed state, and the outer surface groove portion includes a sliding groove portion that is provided so as to extend in the circumferential direction and allows the inward projecting portion to move in the circumferential direction when the inner ring-side cage ring is in a position for setting the second cams in a meshed state.

5. The cam clutch according to claim 1, wherein a position regulating unit for regulating axial direction movement of the plurality of cams is provided on the outer ring.

6. The cam clutch according to claim 1, wherein, in each of the plurality of cams, two side surfaces that contact the outer ring-side cage ring and two side surfaces that contact the inner ring-side cage ring are constituted by curved surfaces configured such that a width direction dimension thereof remains constant regardless of the attitude of the cams.

7. The cam clutch according to claim 6, wherein the two side surfaces of each of the plurality of cams that contact the outer ring-side cage ring are constituted by curves that extend along involute curves having a common base circle on an axial direction plan view, and the two side surfaces of each of the plurality of cams that contact the inner ring-side cage ring are constituted by curves that extend along involute curves having a common base circle on an axial direction plan view.

* * * * *